United States Patent [19]
Hendess

[11] Patent Number: 5,624,692
[45] Date of Patent: Apr. 29, 1997

[54] APPARATUS FOR MEASURING THE TEMPERATURE OF A POLYMER MELT

[75] Inventor: Paul M. Hendess, Wakefield, R.I.

[73] Assignee: Crompton & Knowles Corporation, Stamford, Conn.

[21] Appl. No.: 594,312

[22] Filed: Jan. 30, 1996

[51] Int. Cl.⁶ .................................................. B29C 47/92
[52] U.S. Cl. ........................... 425/144; 425/380; 425/461
[58] Field of Search ............................. 425/144, 143, 425/380, 382.4, 461, 547; 264/406

[56] References Cited

U.S. PATENT DOCUMENTS

| | | | |
|---|---|---|---|
| 2,475,395 | 7/1949 | Lester | 425/144 |
| 3,807,914 | 4/1974 | Paulson et al. | 425/144 |
| 3,899,276 | 8/1975 | Sokolow | 425/380 |
| 4,323,339 | 4/1982 | Kok et al. | 425/380 |
| 4,586,887 | 5/1986 | Gellert | 425/144 |
| 4,711,625 | 12/1987 | Knauer et al. | 425/144 |

FOREIGN PATENT DOCUMENTS 59-70523  4/1984  Japan ........................ 425/380

Primary Examiner—Khanh P. Nguyen
Attorney, Agent, or Firm—Bernard F. Crowe; John R. Doherty

[57] ABSTRACT

A in-line extrusion die is disclosed including a cylindrical mandrel and a die bushing surrounding the mandrel and forming therebetween a passageway leading to an extrusion orifice. The mandrel is mounted to one side of a spider plate and a tailcone is attached to the other side thereof. A die body containing a melt chamber surrounds the tailcone and forms a conical passageway therebetween. A thermocouple is mounted at the apex end of the tailcone for measuring the temperature of the melt as the melt flows from the melt chamber and through the conical passageway. The spider plate contains a plurality of openings which communicate with both passageways and allow the melt to pass through the plate and thence to the extrusion orifice.

12 Claims, 5 Drawing Sheets

APPARATUS FOR MEASURING THE TEMPERATURE OF A POLYMER MELT

BACKGROUND OF THE INVENTION

1. Field of the Invention

The present invention relates generally to apparatus for measuring the temperature of a polymer melt and more particularly to such apparatus employing a conical member having a thermocouple at its apex end immersed in the melt.

2. Description of the Prior Art

The manufacture of thermoplastic articles and particularly tubular products such as pipes and tubes by extruding a polymer melt is generally well known in the prior art. In these processes, the polymer melt is fed from a melt chamber to an annular die comprising basically an outer annular body surrounding an inner mandrel. The melt flows through an annular passageway formed between the annular body and the mandrel and exits through an extrusion orifice where the tube or pipe is formed.

It is important in these extrusion processes to maintain the temperature of the melt within certain desirable limits in order to assure that the melt remains consistent during its travel from the melt chamber to the die. In order to accomplish this goal, it has been the practice to immerse a thermocouple directly into the melt for measuring its temperature. Although this practice has proven satisfactory, it has nonetheless created other serious problems. One problem is that the immersion of the thermocouple in the melt disturbs the melt flow and can produce turbulence causing degradation of the melt. This degradation can lead in many cases to serious defects in the extruded product.

SUMMARY OF THE INVENTION

The principle object of the present invention is to provide an improved apparatus for measuring the temperature of a polymer melt using a thermocouple in contact with the melt but which does not disturb or produce turbulence in the melt.

With this and other related objects in mind, the present invention contemplates an improved apparatus for measuring the temperature of a polymer melt comprising a body containing a melt chamber and having an opening which communicates with the chamber. A conical member having an apex end is positioned within the opening and forms together with the body a generally conical passageway for the flow of melt from the chamber. A thermocouple is mounted at the apex end of the conical member for measuring the temperature of the melt as the melt flows from the chamber and through the passageway. A support member is provided for supporting the conical member and has at least one opening communicating with the passageway for passing the melt therethrough. The conical member allows for the smooth and undisturbed flow of polymer melt from the melt chamber to the conical passageway while the temperature of the melt is being measured by the thermocouple.

In a preferred embodiment of the invention, the support member is a so-called spider plate having an inner segment joined to the main body of the plate by a plurality of spaced apart, tapered legs defining therebetween a plurality of spaced apart, arcuately shaped openings. The plurality of openings lie in a circular path whose diameter is substantially equal to that of the annulus formed by the conical passageway at the point where the conical member joins the inner segment of the plate. The openings communicate with the conical passageway and allow the undisturbed flow of melt through the plate.

The apparatus of the present invention may be used in conjunction with an in-line extrusion die comprising an outer body and an inner mandrel forming together a passageway for delivering the polymer melt to an extrusion orifice. The mandrel is joined to the spider plate at the same inner segment to which the conical member is attached but on the opposite side thereof. The plurality of openings in the plate thus communicate with both passageways allowing the melt to flow continuously from the melt chamber to the extrusion orifice. In this embodiment, the conical member is a tailcone having an axial bore extending therethrough to its apex end. The thermocouple is mounted in the axial bore and exposed to the melt as it passes through the melt chamber.

DESCRIPTION OF THE PREFERRED EMBODIMENTS

Figure 1:
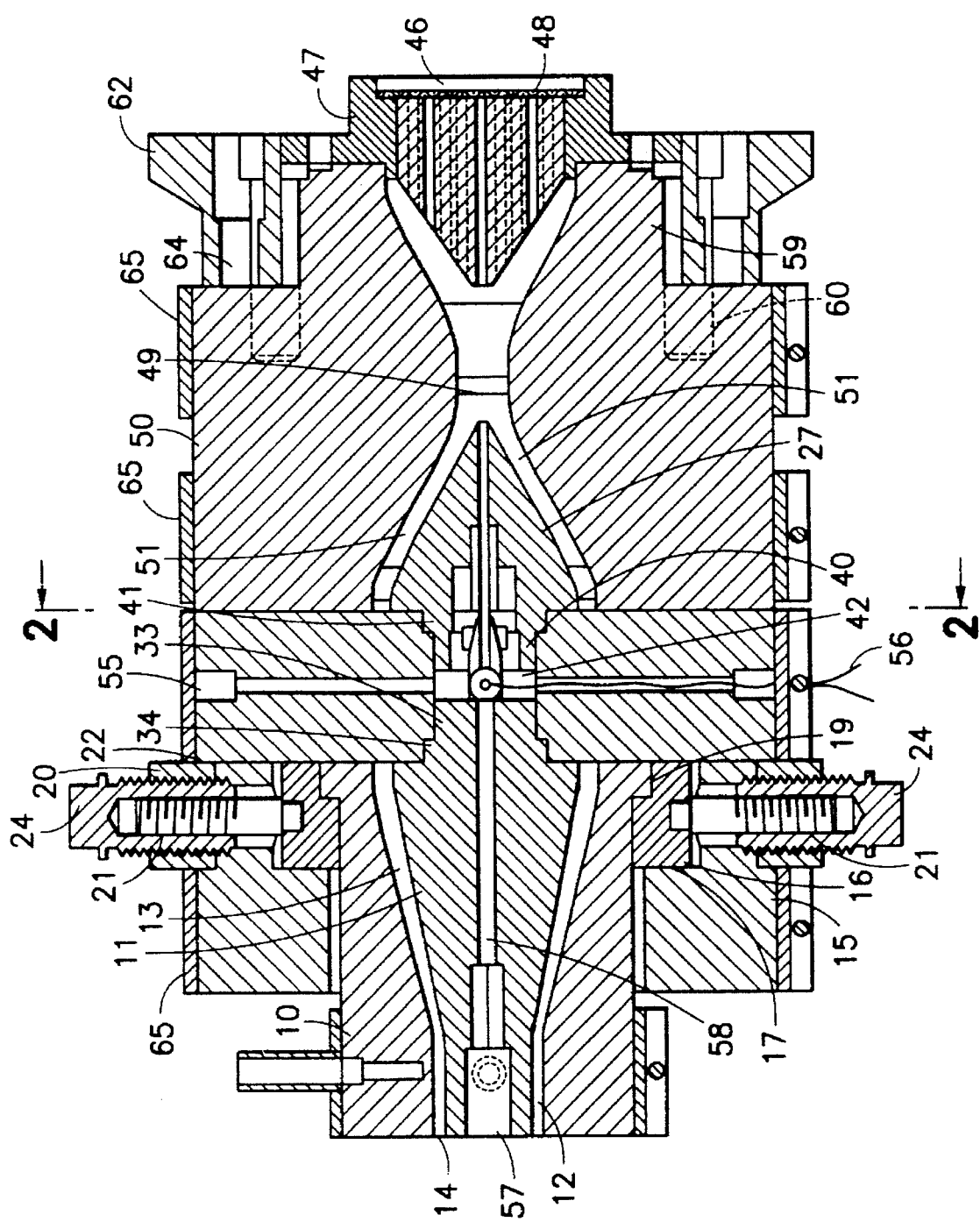
FIG. 1 is a sectional view of an in-line extrusion die incorporating a melt thermocouple in accordance with the invention.

Referring now to the drawings and particularly to FIG. 1, there is shown an in-line extrusion die embodying the invention. As shown, the in-line extrusion die comprises a generally elongated, cylindrically shaped die bushing 10 mounted coaxially around a mandrel 11 forming therebetween an annular passageway 12 at the upstream end of the bushing 10 and a conical passageway 13 at the downstream end thereof. The annular passageway 12 communicates with an annular extrusion orifice 14 formed between the die bushing 10 and the mandrel 11. As will be described hereinafter in greater detail, a polymer melt is fed continuously through the passageways 12 and 13 and is extruded through the orifice 14 forming a single layer plastic tube.

An annular retaining plate 15 is positioned around the downstream end of the die bushing 10. A centering ring 16 is inserted within an annular recess 17 provided on the retaining plate 15. The bushing 10 is also formed with an annular seat 18 (FIG. 6) which fits tightly within an annular recess 19 provided on the back side of the ring 16.

Figure 6:
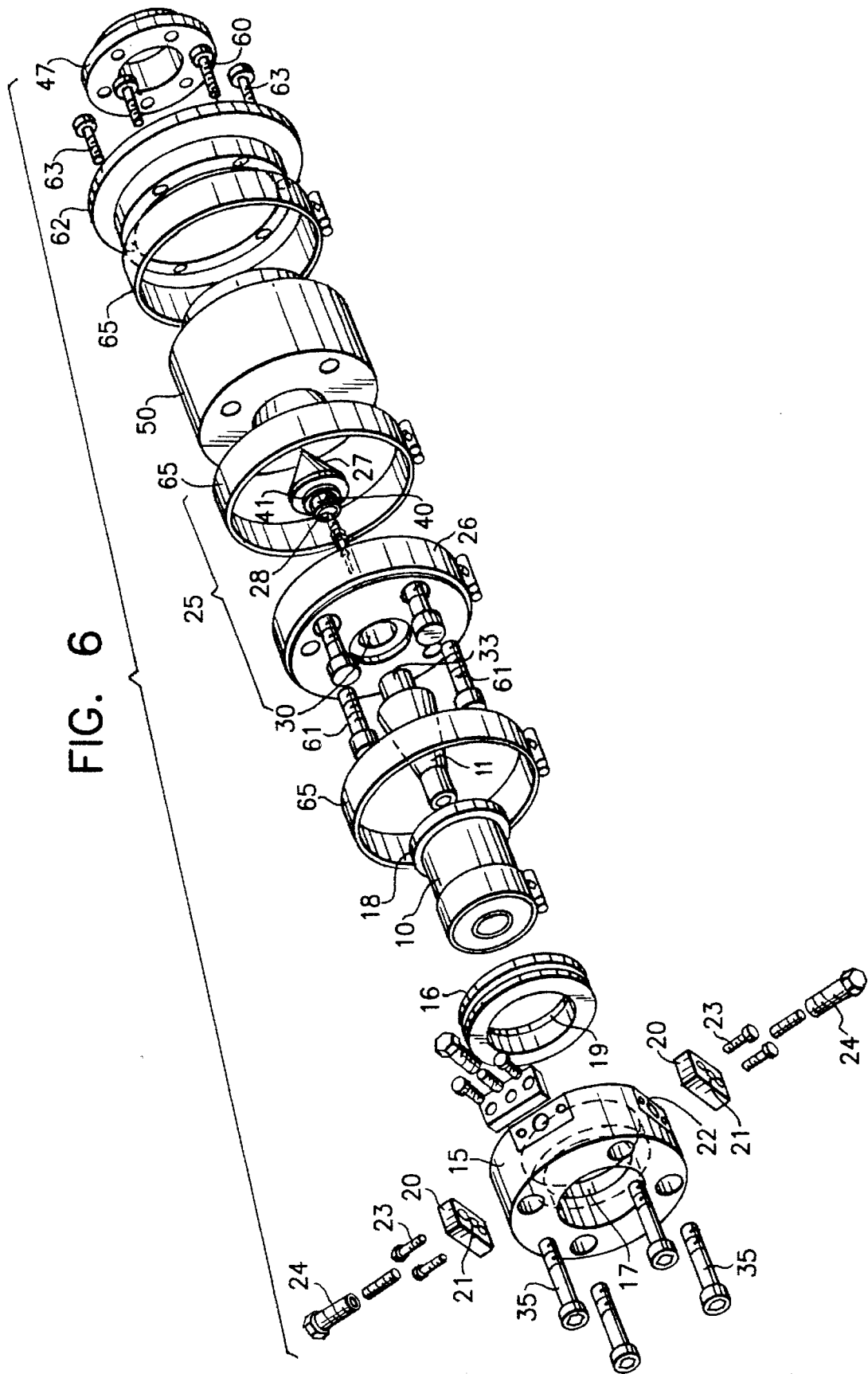
FIG. 6 is an exploded perspective assembly view of the entire in-line extrusion die shown in FIG. 1.

A plurality of rectangular blocks 20 having threaded bores 21 are mounted within rectangular recesses 22 on the outer surfaces of the retaining plate 15, there being four such blocks in the embodiment shown in the drawing (FIG. 6). The blocks 20 are spaced equally apart around the plate 15 and are secured in place by screws 23. A plurality of centering bolts 24 are threaded through the bores 21 in each block and extend into threaded engagement with the centering ring 16. By adjusting the bolts 24, the centering ring 16, which is in contact with the die bushing 10, is able to move the bushing and properly align it with respect to the mandrel 11. In this way, uniformity of the melt flow through the passageways 12 and 13 toward the extrusion orifice 14 is assured.

Figure 7:
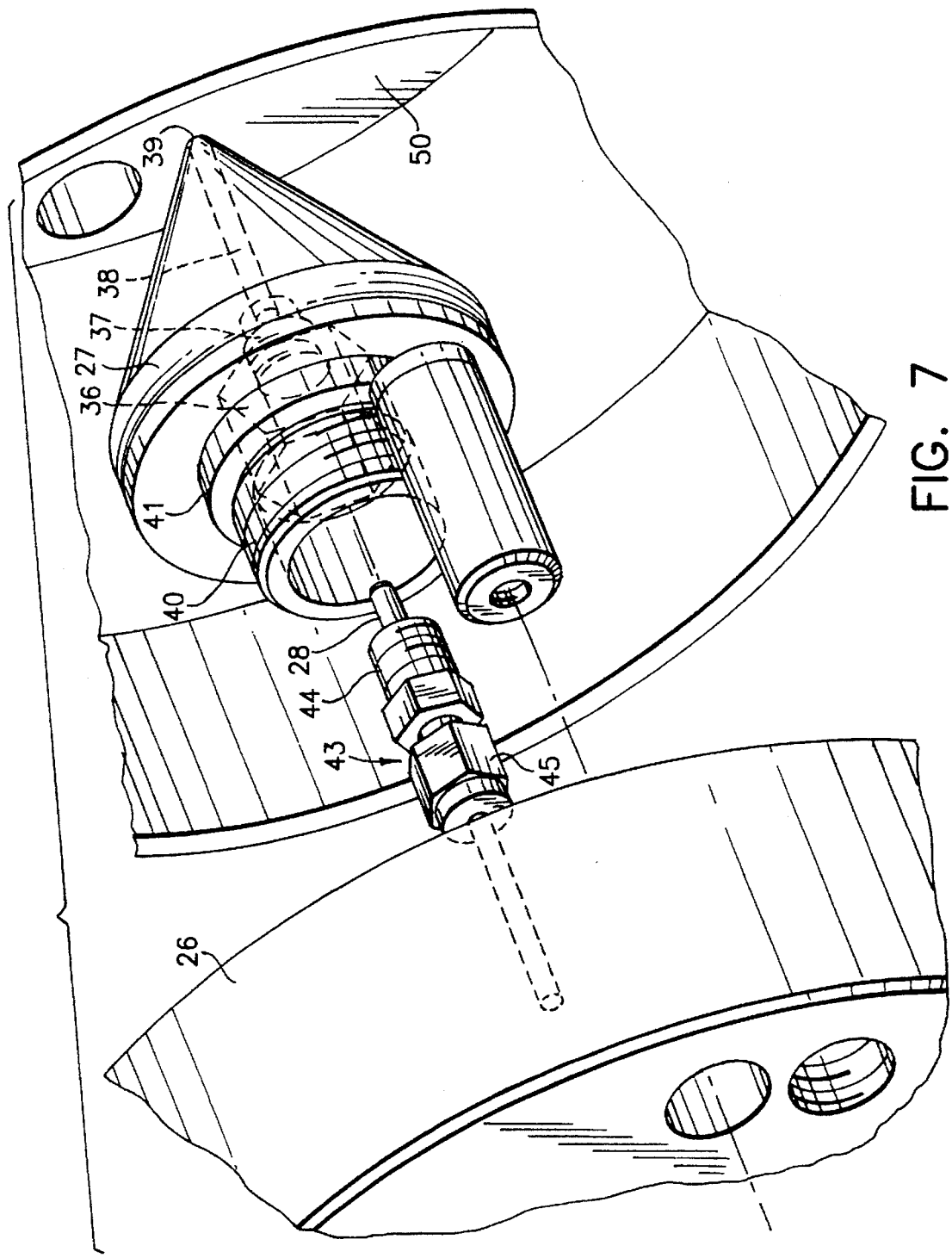
FIG. 7 is a greatly enlarged view of part of the extrusion die shown in FIG. 6.

The in-line extrusion die described hereinabove, including the die bushing 10, mandrel 11, retaining plate 15, ring 16, blocks 20 and centering bolts 24, are all generally well known and do not, per se, constitute part of the present invention. They may be replaced by other well known single or multilayer die apparatus or by other well known feed distribution systems for feeding polymer melts to other dies or similar mechanisms. The present invention is rather concerned with the measurement of melt temperature by immersion of a melt thermocouple directly into the melt flow upstream from the extruder, feed distribution system or other mechanism employed. To this end, the present invention, as applied to the embodiment of the in-line extrusion die shown in the drawing, employs a so-called spider cone assembly generally indicated at 25 in the assembly view of FIG. 6. As shown in greater detail in FIG. 7, this spider cone assembly includes a circular spider plate 26, a tailcone 27 and a melt thermocouple 28.

Figure 2:
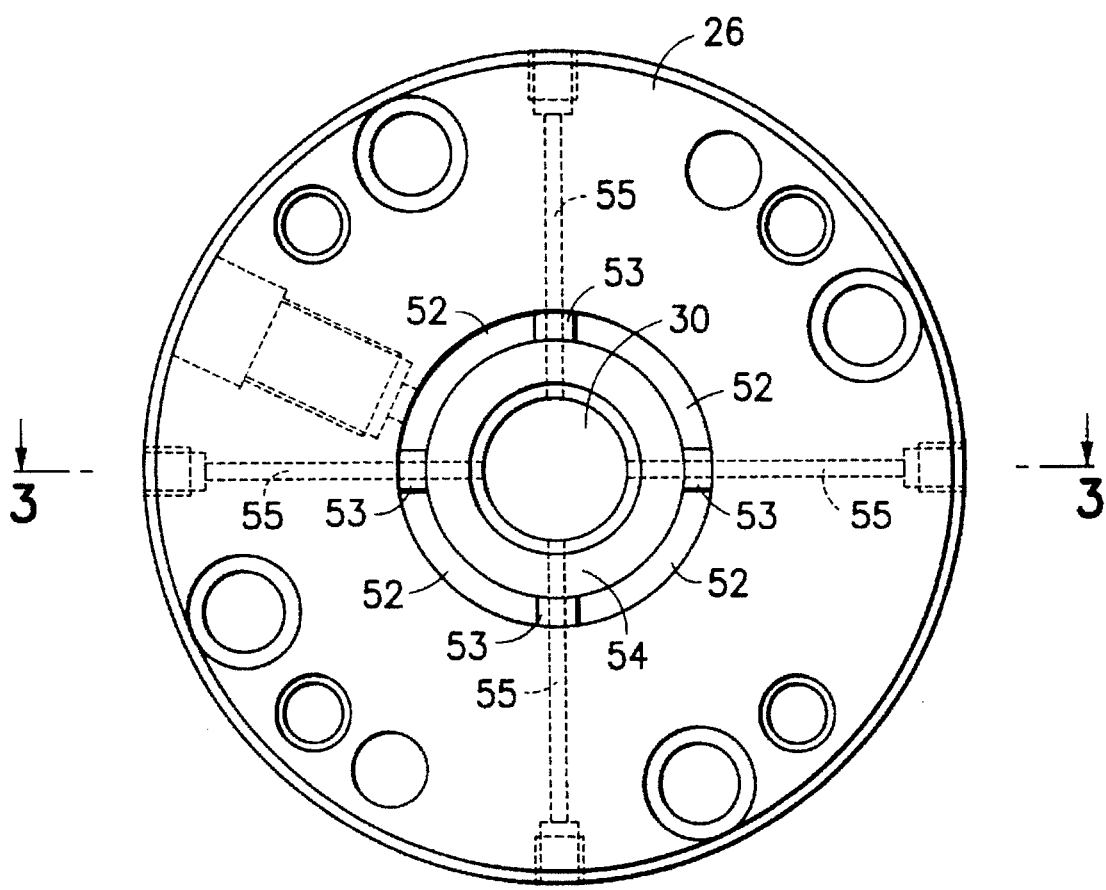
FIG. 2 is a plan view of a spider plate used in the in-line extrusion die taken along the lines 2—2 in FIG. 1.
Figure 3:
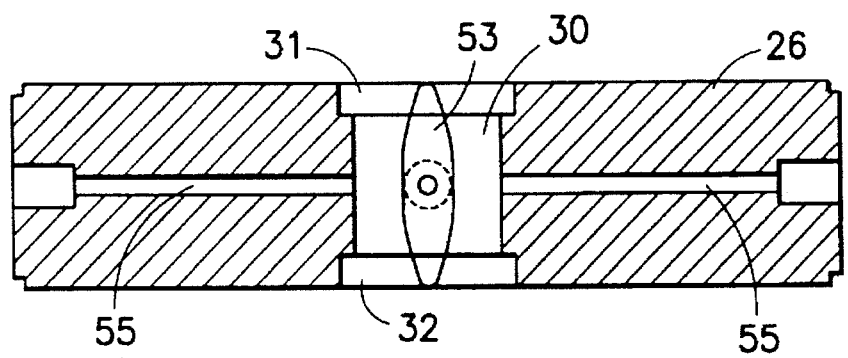
FIG. 3 is a sectional view of the spider plate taken along the lines 3—3 in FIG. 2.

The spider plate 26 has a threaded center bore 30 surrounded by two shallow counterbores 31, 32 on each of its opposite sides as best shown in FIGS. 2 and 3. The mandrel 11 has an annular collar 33 on its upstream end (FIG. 6) which is threaded into the center bore 30 of spider plate 26. The mandrel 11 is also formed with an annular seat 34 (FIG. 1) surrounding the collar 33 which fits tightly within the counterbore 31. The retaining plate 15 and ring 16 are then fastened tightly to the spider plate 26 around the mandrel 11 by a plurality of bolts 35.

Figure 5:
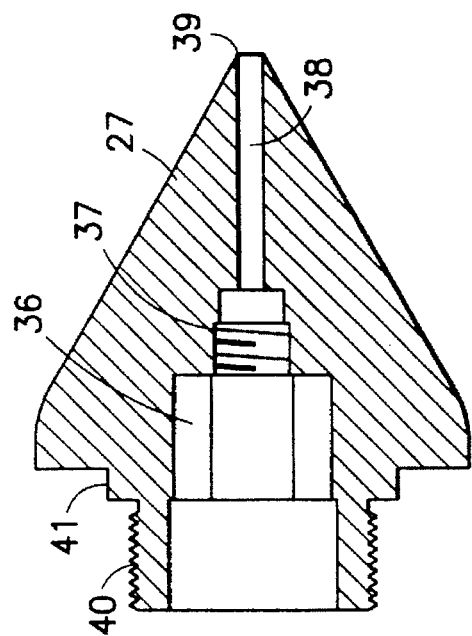
FIG. 5 is an enlarged sectional view of a tailcone used in the in-line extrusion die shown in FIG. 1.

The tailcone 27 is shown in enlarged detail in FIG. 5. As shown, the tailcone 27 is conically shaped and has a center bore 36 drilled part way through its downstream end. The bore 36 leads into a threaded, reduced diameter counterbore 37 which in turn leads to an elongated narrow bore 38 extending axially through the tailcone to its outer apex end 39. A threaded tubular collar 40 extends outwardly from the center bore 36 and is surrounded by an annular seat 41 similar to that provided on the mandrel 11.

The tailcone 27 is mounted to the spider plate 26 in the same manner as the mandrel 11. The collar 40 is threaded into the center bore 30 until the annular seat 41 rest tightly against the counterbore 32. It should be noted that the configuration and dimension of the two annular seats 34, 41 on the mandrel 11 and tailcone 26, respectively, are such that the ends of each collar 33, 40 are separated from one another and define within the center bore 30 an open space 42 (FIG. 1) for purposes to be made clear hereinafter.

A tube pipe fitting 43 is provided for mounting the melt thermocouple 28 inside the tailcone 27. This fitting as best seen in the enlarged view of FIG. 7 includes a threaded tubular stem 44 and a compression nut 45. The tubular stem 44 has an hexagonal head and is threadably mounted inside the reduced diameter counterbore 37.

The thermocouple 28 is provided in the form of an elongated rod which passes through both the tubular stem 44 and the compression nut 45. The thermocouple extends through the narrow axial bore 38 a sufficient distance to place it in exposed position at the tailcone apex end 39.

A polymer melt is supplied from a suitable source, such as a resin extruder, through an inlet opening 46 in a circular end plate 47. The melt passes through a breaker plate 48 containing a coarse filtering medium and enters a melt chamber 49 formed inside a cylindrical die body 50. The melt passes through the chamber 49 and flows evenly through a conical passageway 51 formed between the tailcone 27 and the die body 50 and thence through a plurality of openings 52 (FIG. 2) in the spider plate 26. The melt then enters the conical passageway 13, passes through the annular passageway 12 and thence onto the extrusion orifice 14 where the melt is extruded into a single layer tube.

It will be seen by this arrangement that the thermocouple 28, placed at the tailcone apex end 39, lies in close proximity to and in axial alignment with the melt chamber 49 and that, accordingly, the thermocouple 28 is immersed at the center of the melt flow where it can most accurately measure the melt temperature. The smooth conical surfaces of the tailcone 27 gently guide the melt around the thermocouple and there is no turbulence or eddy currents created in the melt flow which might otherwise cause flow disturbances or polymer deteriorations and resulting defects in the extruded tube.

Figure 4:
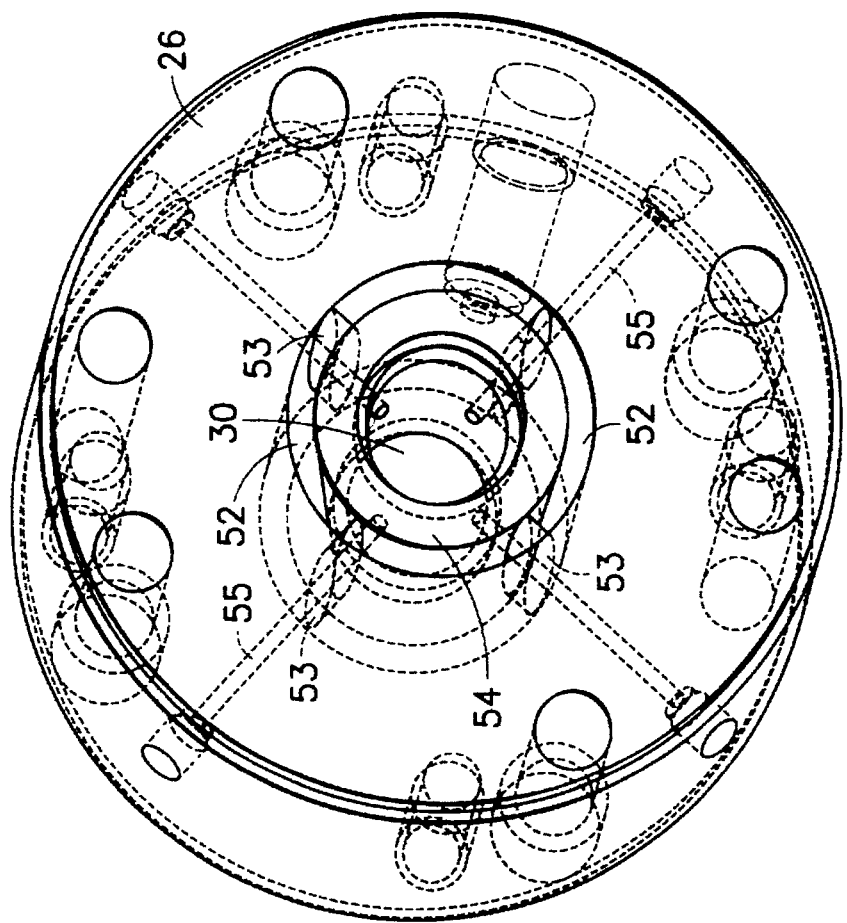
FIG. 4 is a perspective view of the spider plate shown in both FIGS. 3 and 4.

The structure of the spider plate 26, and particularly the plurality of openings 52, is shown in detail in FIGS. 2–4, inclusive. The openings 52 are arcuately shaped and lie in a circular path, the diameter of which is equal to that of the annulus formed by each of the passageways 13 and 51 at the point where the mandrel 11 and tailcone 27, respectively, join the spider plate 26. There are four openings 52 in the embodiment of the spider plate shown, each separated from the other by a plurality of equally spaced apart, tapered legs 53 (hence the term "spider plate"). The legs 53 join together the main body portion of the plate 26 and an inner annular portion 54 containing the center bore 30. Each of the legs 53 is tapered to an edge on each end as probably best shown in the views of FIGS. 3 and 4. By this construction, it will be seen that the legs 53 minimize any disturbance in the melt flow and allow for a smooth transition of melt through the spider plate. The spider plate can be made integral in one piece by known methods or it can be assembled by silver soldering, for example, or other known processes.

A plurality of channels 55 extend radially through the spider plate 26 from the outer surfaces thereof to the internal space 42 defined inside the center bore 30 as hereinabove described. There are four such channels 55 in the embodiment of the spider plate shown in the drawing (FIG. 4). One of the channels 55 carries the electrical leads 56 attached to the thermocouple 28 from inside the extruder as shown in FIG. 1. The leads are connected in turn to a suitable recording device for recording the temperature of the melt. In the case where the extruder may be used in the blown film process for forming the plastic tube, another one of the channels 55 may also be employed to carry air under pressure from an external source to an opening 57 located at the center of the extrusion orifice 14 via a separate channel 58 disposed axially through the mandrel 11.

The circular end plate 47 containing the inlet opening 46 described hereinabove is secured to the downstream end of the die body 50 around a reduced diameter end 59 by a plurality of bolts 60. The die body 50 is in turn secured to the spider plate 26 also by a plurality of bolts 61. An annular mounting ring 62 surrounds both the reduced diameter end 59 of the die body 50 and the end plate 47 and is also secured to the die body 50 by a plurality of bolts 63. The ring 62 has a number of threaded bores 64 for mounting the die body to the resin extruder or other source of the polymer melt.

A plurality of heating bands 65 are secured tightly around the outer surfaces of the retainer plate 15, spider plate 26 and the die body 50 for heating the respective parts and thereby maintaining the melt at a desired temperature as it flows from the inlet opening 46 to the melt chamber 49 and thence onto the extrusion orifice 14.

It will be seen from the above that the present invention provides an improved thermocouple assembly for measuring the temperature of a polymer melt flowing through a melt chamber to an in-line tube extruder or other mechanism such as a resin feed distribution system or the like. The thermocouple assembly of the present invention is totally immersed at the center of the melt flow for accurate measurement of the melt temperature and does not cause any disturbances which might otherwise result in undesirable defects in the end product.

What is claimed is:

1. An apparatus for measuring the temperature of a polymer melt, comprising:

a body containing a melt chamber, said body having an opening communicating with said melt chamber;

a conical member having an apex end positioned within said opening and forming together with said body a generally conical passageway for the flow of melt from said chamber;

a thermocouple mounted at said apex end of said conical member, said thermocouple measuring the temperature of said melt as said melt flows from said chamber around said conical member and through said passageway; and means for supporting said conical member having at least one opening therein communicating with said passageway for passing said melt therethrough.

2. An apparatus in accordance with claim 1, wherein said means for supporting said conical member comprises a spider plate having a main body portion and an inner segment joined to said main body portion by a plurality of spaced apart, tapered legs, said legs defining therebetween a plurality of spaced apart, arcuately shaped openings communicating with said conical passageway.

3. An apparatus in accordance with claim 2, wherein said inner segment comprises an annular ring defining a central bore and wherein said conical member has a collar which is joined to said central bore.

4. An apparatus in accordance with claim 3, wherein said conical member has an axial bore communicating with said collar and extending to said apex end thereof, said thermocouple being mounted through said axial bore.

5. An apparatus in accordance with claim 4, wherein said spider plate has a radially disposed channel therein extending from said central bore to the outer surface thereof, passing through one of said legs, and wherein said thermocouple has leads extending through said central bore and said channel.

6. An in-line extrusion die comprising, in combination:

an elongated cylindrical mandrel;

a die bushing surrounding said mandrel and forming therebetween a passageway leading to an extrusion orifice;

a spider plate having a main body portion and an inner segment joined to said main body portion by a plurality of spaced apart, tapered legs, said legs defining therebetween a plurality of spaced apart, arcuately shaped openings communicating with said passageway formed between said die bushing and said mandrel;

means for joining said mandrel to said inner segment on one side of said spider plate;

a die body containing a melt chamber, said body having an opening communicating with said melt chamber;

means for feeding a polymer melt to said melt chamber;

a tailcone having an apex end positioned within said opening in said die body and forming together with said die body a generally conical passageway for the flow of melt from said chamber, said conical passageway communicating with said plurality of arcuately shaped openings in said spider plate allowing said melt to flow through said plate to said passageway defined between said die bushing and said mandrel;

means for joining said tailcone to said inner segment on the opposite side of said spider plate; and a thermocouple mounted at said apex end of said tailcone, said thermocouple contacting said melt as said melt flows from said chamber around said tailcone and through said passageway.

7. An in-line extrusion die in accordance with claim 6, wherein said inner segment of said spider plate comprises an annular ring defining a central bore.

8. An in-line extrusion die in accordance with claim 7, wherein said means for joining said tailcone to said spider plate comprises a collar formed on said spider plate and attached to said central bore.

9. An in-line extrusion die in accordance with claim 8, wherein said tailcone has an axial bore communicating with said collar and extending to said apex end thereof, said thermocouple being mounted through said axial bore.

10. An in-line extrusion die in accordance with claim 9, wherein said thermocouple has electrical leads and wherein means are provided for carrying said leads through said spider plate.

11. An in-line extrusion die in accordance with claim 10, wherein said means for carrying said leads comprises a radially disposed channel formed in said spider plate and passing through one of said legs, said channel extending from said central bore to the outer surface said plate.

12. An in-line extrusion die in accordance with claim 11, wherein said means for joining said mandrel to said spider plate comprises a collar formed on said mandrel and attached to said central bore.

* * * * *